United States Patent
Glenn et al.

(10) Patent No.: US 8,489,357 B2
(45) Date of Patent: Jul. 16, 2013

(54) CURRENT AND TEMPERATURE SENSING OF STANDARD FIELD-EFFECT TRANSISTORS

(75) Inventors: Jack L. Glenn, Kokomo, IN (US); Mark A. Gose, Kokomo, IN (US); Peter A. Laubenstein, Sharpsville, IN (US); Seyed R. Zarabadi, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 238 days.

(21) Appl. No.: 12/999,131

(22) PCT Filed: Jul. 23, 2009

(86) PCT No.: PCT/US2009/051512
§ 371 (c)(1),
(2), (4) Date: Dec. 15, 2010

(87) PCT Pub. No.: WO2010/011825
PCT Pub. Date: Jan. 28, 2010

(65) Prior Publication Data
US 2011/0112792 A1    May 12, 2011

Related U.S. Application Data

(60) Provisional application No. 61/136,000, filed on Jul. 25, 2008.

(51) Int. Cl.
*G01K 7/16*    (2006.01)

(52) U.S. Cl.
USPC .......................................................... 702/133

(58) Field of Classification Search
USPC .......................................................... 702/133
See application file for complete search history.

(56) References Cited

U.S. PATENT DOCUMENTS

| | | | |
|---|---|---|---|
| 5,543,746 A | 8/1996 | Kuo | |
| 6,408,425 B1 | 6/2002 | Mizutani | |
| 7,333,904 B2 | 2/2008 | Turner et al. | |
| 2007/0061099 A1* | 3/2007 | Turner et al. ................ | 702/130 |

FOREIGN PATENT DOCUMENTS

| JP | 11-326400 | 11/1999 |
|---|---|---|
| JP | 2002-290222 | 10/2002 |

OTHER PUBLICATIONS

Japan Office Action translated in English.
English Translation Japan 11-326400.
English Translation Japan 2002-290222.

* cited by examiner

*Primary Examiner* — Stephen Cherry
(74) *Attorney, Agent, or Firm* — J. Gordon Lewis

(57) ABSTRACT

An apparatus and method of determining the junction temperature (Tj) and drain-source current (Ids) of a standard FET within a multi-FET module includes a control IC managing one or more 3 terminal standard FETs within the same package, calculating Tj and Tds for one or more FETs in one or more packages, and protecting each FET against short circuit faults while allowing high current transients, such as inrush currents from a lamp load.

2 Claims, 2 Drawing Sheets

CURRENT AND TEMPERATURE SENSING OF STANDARD FIELD-EFFECT TRANSISTORS

TECHNICAL FIELD

The present invention relates to sensors and, more particularly, to a method and apparatus for measuring current and temperature in standard field-effect transistors.

BACKGROUND OF THE INVENTION

In automotive applications, electrical loads, such as lamps, motors, solenoids and the like, are typically controlled by an electrical switch, such as a field-effect transistor (FET) or a relay. Such switches are often grouped together in a module and are selectively (de)activated by a pre-drive or control integrated circuit (IC), which can be embodied as a custom application specific integrated circuit (ASIC), a microcontroller (µC), or can be integrated into the FET itself. Switches must allow enough current to flow to the loads during normal operation and prevent current from flowing in the event of an over-current or over-temperature event that may destroy the FET, the load, or the associated vehicle wiring.

In addition to self protection, a vehicle engine control system needs an accurate measurement of FET current to ensure that loads used in safety related applications are functioning properly.

Several distinct types of FETs can be applied for switching applications. Standard FETs are three terminal devices, including a source, drain and gate. In order to sense the drain to source current (Ids) from a standard FET, at least one additional current sensing element is required, such as a current sensing resistor placed in series with the load current from which the resistor voltage is monitored. Current and temperature sensing FETs (sense FETs) are similar to standard FETs but have one or two additional features. First, sense FETs have one or more additional source terminals which carry a small fraction of the load current which can be monitored by an external control circuit to determine overall Ids. Second, sense FETs have one or more integrated temperature sensing diodes which sample the FET junction temperature (Tj). Smart FETs are similar to sense FETs but also have the ability to protect themselves from over-current and over-temperature events without an external control IC. Sense FETs and smart FETs typically have sufficient current sensing accuracy for use in automotive safety related applications, but are substantially more expensive than standard FETs. Even though multiple sense FETs and smart FETs are routinely incorporated within a common package to save board space, their cost remains problematic.

It has been suggested that Ids can be determined for standard FETs without the need of an external current sensing element by measuring the FET Vds and by assuming a value for the on-resistance (Rds) of the FET. However, Rds varies significantly with temperature and thus is expressed as a function of Tj as Rds (Tj). In a typical FET, for example, Rds(175C) is twice the value of Rds(25C). Assuming the FET is off and at ambient temperature (Ta), the application of Ids which flows through Rds will cause a power ($Ids^2*Rds(Tj)$) to be dissipated by the FET. The heat generated by this power will primarily flow through a thermal resistance between the FET junction and case (Rth,jc) and subsequently through a thermal resistance between the FET case and ambient (Rth, ca), where Rth,ca >> Rth,jc and thus Rth,jc can typically be neglected. Accordingly, the heat flow that determines Tj can be described by the following equation $$Tj = Ta + Ids^2 * Rds(Tj) * Rth,ca \quad (1)$$

Tj and thus Rds are dynamic and in general unknown unless they are directly measured or calculated. Furthermore, Rds is generally a non-linear function of Tj such that solving (1) will in general require mathematical iteration. These facts discourage the estimation of Ids for standard FETs by measurement of Vds if Tj and thus Rds are not independently measured. By analogy, it has been suggested that the value of Tj can be determined for a standard FET by measuring Vds and Ids and calculating Rds which can then be used to determine the value of Tj but this requires that Ids be measured separately from Vds and thus requires the addition of an external current sensing element, thus increasing the cost.

As a further complication, it is desirable to place multiple FETs in a single package having a common drain terminal and thus common case terminal. Since the FETs have a common case, heat generated from each FET will flow through a common thermal path from case to ambient and the junction temperature of each FET will be interdependent. The junction temperature Tj for "n" non-parallel FETs in a common case is described by the following equation (sum over i=1 to n):

$$Tj = Ta + \Sigma\{Ids(i)^2 * Rds(i,Tj)\} * Rth,ca; \quad (2)$$

By analogy with (1), (2) is in general a non-linear function requiring mathematical iteration to solve Tj to high accuracy.

Prior art U.S. Pat. No.: 7,154,291 B2 to Turner entitled "Measuring Bi-Directional Current Through A Field-Effect Transistor By Virtue Of Drain-To-Source Voltage Measurement" describes a method and apparatus for measuring Ids, and particularly bi-directional current, in a field-effect transistor (FET) using Vds measurements.

Prior art U.S. Pat. No.: 4,896,245 (Qualich) entitled "FET Overtemperature Protection Circuit", prior art U.S. Pat. No. 7,248,452 (Ohshima) entitled "Method of Protecting Semiconductor Device and Protection Apparatus for Semiconductor Device using the same", and prior art U.S. Pat. No. 6,107,669 (Mokuya) entitled "Load Actuating Semiconductor Circuit Having a Thermally Resistive Member" all describe methods and apparatus for detecting FET Tj by monitoring Vds for a known Ids.

The specification and teachings of U.S. Pat. Nos. 7,154,291 B2, 4,896,245, 7,248,452, and 6,107,669 are hereby incorporated herein be reference.

Existing standard FET solutions which use only the measured value of Vds and known temperature dependence of Rds(Tj) to estimate Ids and Tj have insufficient accuracy for automotive safety applications because they either assume a value for Tj leading to a value for Rds which is then used to estimate Ids or they assume a value for Ids which is then used to determine a value for Rds leading to a value for Tj. Since Tj and Ids can vary significantly from the assumed value, the accuracy of these approaches can have significant error, especially when multiple FETs are thermally coupled by virtue of being placed on a common case.

Accordingly, what is required is a method for determining the Ids and Tj with high accuracy, for one or more thermally-coupled or uncoupled standard FETs, without the use of additional current or temperature sensing elements. The values of Ids and Tj once determined, can then be used to protect the devices against over current or over temperature stress.

SUMMARY OF THE INVENTION

An object of the present invention is to provide a method for determining the Ids and Tj with high accuracy, for one or more thermally-coupled or uncoupled standard FETs, without the use of additional current or temperature sensing elements.

A further objective is to protect 3-terminal FETs from excessive Ids and Tj.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings wherein like reference numerals refer to like parts throughout the several views, and wherein.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

Figure 2:
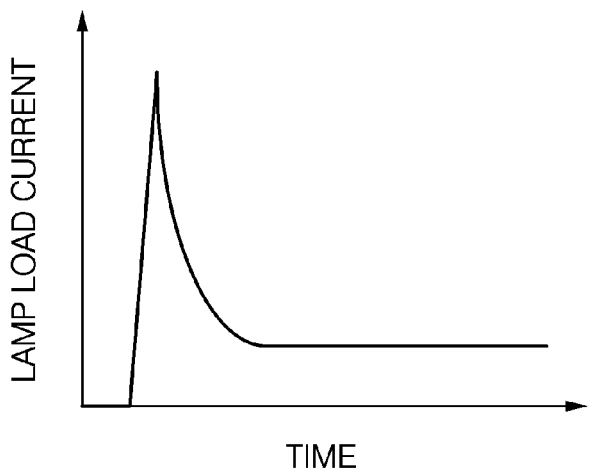
FIGS. 2A and 2B, are graphical depictions of a lamp inrush event during load turn on with 2A representing lamp current and 2B representing a resulting FET Vds.
Figure 2:
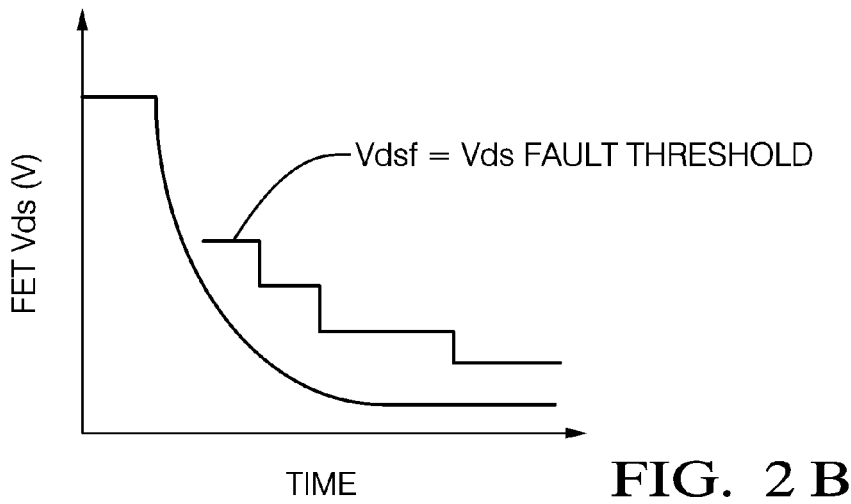
Figure 3:
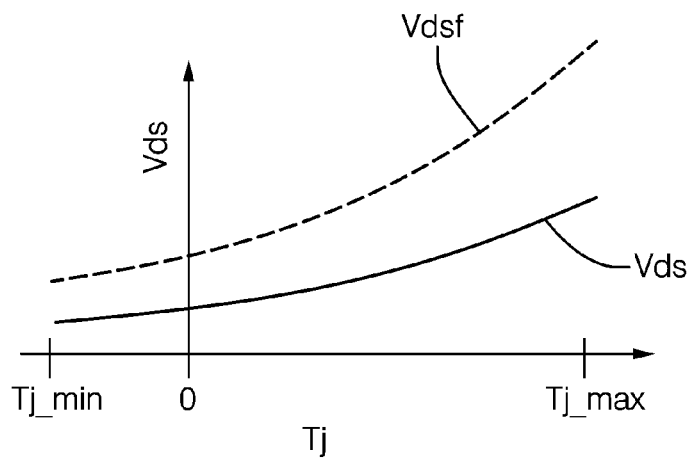
FIG. 3, is a graphical depiction of Vds fault threshold (Vdsf) to catch an over current or over temperature transient event between Vds samples which must be a function of Tj.

An apparatus, such as a control IC, will now be described in detail with reference to FIGS. 1 to 3 of the accompanying drawings. The apparatus is used for determining junction temperature (Tj) and drain-source current (Ids) of one or more standard three-terminal or "dumb" field-effect transistors, which may or may not be thermally coupled, according to preferred embodiments of the present invention, Referring to FIG. 1, a measurement circuit or apparatus, shown generally at 10, contains functional blocks in a control circuit 32 which are capable of extracting Ids and Tj to high accuracy for one or more standard FETs which may or may not be thermally-coupled. A FET grouping including FET HF(1) 42 and a FET HF(2) 43 have their respective drains electrically and thermally attached to a common case 47 which is thermally coupled through a thermal resistance Rth,cal 71 to ambient temperature Ta 53. A second FET grouping including FET HF(3) 50 has it's drain electrically and thermally attached to a case 49, which is thermally coupled through a thermal resistance Rth,ca2 73 to Ta 53.

The measurement circuit 10 comprises a control integrated circuit (IC) 32 which manages two or more standard FETs 42 and 43 which are thermally-coupled by virtue of being mounted in a common case 47, and/or a standard FET 50 which is mounted in thermally isolated case 49. As will be described in greater detail herein below, the control IC 32 digitally processes an algorithm for calculating Tj and Ids for each FETs 42, 43, and 50 in one or more of the cases 47 and 49. The measurement circuit 10 functions to protect each FET 42, 43, and 50 against short circuit faults while allowing high current transients, such as inrush currents from lamp load. Refer to FIGS. 2 and 3.

The control IC 32 is connected to a power source 33 and IC ground 34, and has a number of control, logic and function blocks integrated therein. A high side FET gate drive circuit 41 is employed to control one or more high side FETs 42, 43 and 50. The gate and source terminals of each high side FET 42, 43, and 50 are in circuit with the high side gate drive circuit 41. The source terminal of each of the high side FETs 42, 43, and 50 is connected to respective high side loads 44, 45, and 51, designated Zhf(1), Zhf(2), Zhf(3) and to the high side gate drive circuit 41. The drain terminals of one or more high side FETs 42, 43, and 50 are connected to a battery line 46 of an associated voltage source 48 which is connected to a vehicle ground terminal 35. Although only a single high side gate drive circuit 41 is illustrated, it is contemplated that a plurality, such as one for each high side FET 42, 43, and 50, could be implemented.

A drain-source voltage (Vds) fault comparator circuit 40 is provided for each high side FET 42, 43, and 50. The Vds fault thresholds are varied with time to allow acceptable transient currents, such as lamp inrush. The comparator circuitry functions to directly command off the gate drive of a FET if the fault threshold is exceeded for more than the glitch timeout period.

The control IC 32 includes one or more sample and hold circuits 58 which operate to sample the Vds of each FET 42, 43, and 50, either in series or parallel. The sample and hold circuits 58 are in circuit with the high side FET gate drives 41.

The control IC 32 includes one or more analog to digital converters (ADC) 60 in circuit with the sample and hold circuits 58 which operate to convert sampled Vds signals. The control IC 32 includes a digital circuit block 63 which calculates Tj for each FET case, a digital circuit block 65 uses the calculated Tj value from block 63 to solve for Rds(Tj) for each FET, a digital circuit block 66 which uses the calculated value of Rds(Tj) from block 65 to calculate a value for Ids=Vds/Rds(Tj) for each FET, and a PWM control circuit 67, all of which are interconnected with the ADC 60, which functions to run stored digital algorithms.

The control IC 32 includes an ambient temperature sensing circuit 64 and non-volatile memory 66 which contains the stored equations for the Rds(Tj) of each FET 42, 43, and 50 and the stored thermal resistance Rth,cal 71 between case 47 and ambient 53 and the stored thermal resistance Rth,ca2 73 between case 49 and ambient 53.

In essence, circuit 10 operates to solve for Tj and Ids of a standard (dumb) FET. The control IC 32 functions by sampling Ta 53. The control IC 32 samples the drain to source voltage (Vds) for a given FET. If there is more than one non-parallel FET with a common drain in the package, such as 42 and 43, the Vds of each FET attached to the same case is sampled. The control IC 32 includes programmed values in non-volatile memory 66 for the thermal resistances 71 and 73 and for the Rds(Tj) of each FET. One preferred approach is to define $Rds(Tj)=aTj^2+bTj+c$, where each of the coefficients a, b and c can be unique for each FET and are stored in non-volatile memory 66.

To protect each FET against an excessive steady state temperature, the calculated Tj is compared in digital logic to a predefined maximum value and the FET can be turned off if it is determined to be in an over-temperature condition. To protect each FET against an excessive steady state current (Ids), the calculated value of Ids is compared in digital logic to a predefined maximum value and the FET can be turned off if it is determined to be in an over-current condition.

To protect against transient current surges, such as lamp inrush events or hard short circuits, a maximum allowable transient Ids (Idsf) is loaded from non-volatile memory for each FET. Idsf can be varied with time to allow lamp inrush and other transient current events such as illustrated in FIG. 2.

Idsf can be related to a maximum allowed Vds (Vdsf) by Vdsf=Idsf*Rds(Tj) using the last calculated value for Rds(Tj) and where it is understood that these transient events are short enough in duration and in energy that they do not substantially change the value of FET Tj and thus Rds(Tj). A voltage comparator is used to monitor Vds and if Vds>Vdsf, then the Ids>Idsf and the FET will be is shut off to protect it against over stress. Vdsf for each FET can be varied as a function of time (refer FIGS. 2A and 2B) to allow transient lamp inrush currents and varied as a function of Tj (refer FIG. 3).

When a command is received to turn a FET on into a load, the digital algorithms perform the following functions for each FET case 47/49:

(I) Ta is loaded;

(II.) Idsf for each FET is loaded;

(III.) A value for Vdsf is calculated as Idsf*Rds(Ta) for each FET and loaded into the respective Vds fault comparators;

(IV) The FET is turned on and Vds is monitored by the Vds fault comparator against the value Vdsf which may change as a function of time according to the expected load current;

(V) Vds(i) values for each non-parallel FET (i) on a common case are loaded;

(VI) The PWM duty cycle for each FET (i) (Pd(i)) from 0 to 1 is loaded or set to 1 if the FET is on in DC mode;

(VII.) Stored values for Rds(Tj) for each non-parallel FET on a common case are loaded;

(VIII.) A stored value of the thermal resistance Rth,ca is loaded;

(IX.) The junction temperature Tj for "n" non-parallel FETs in a common package is solved using the following equation (sum over i=1 to n):

$$Tj = Ta + \Sigma (Pd(i) * Vds(i)^2 / Rds(i, Tj)) * Rth, ca \quad (3)$$

Figure 1:
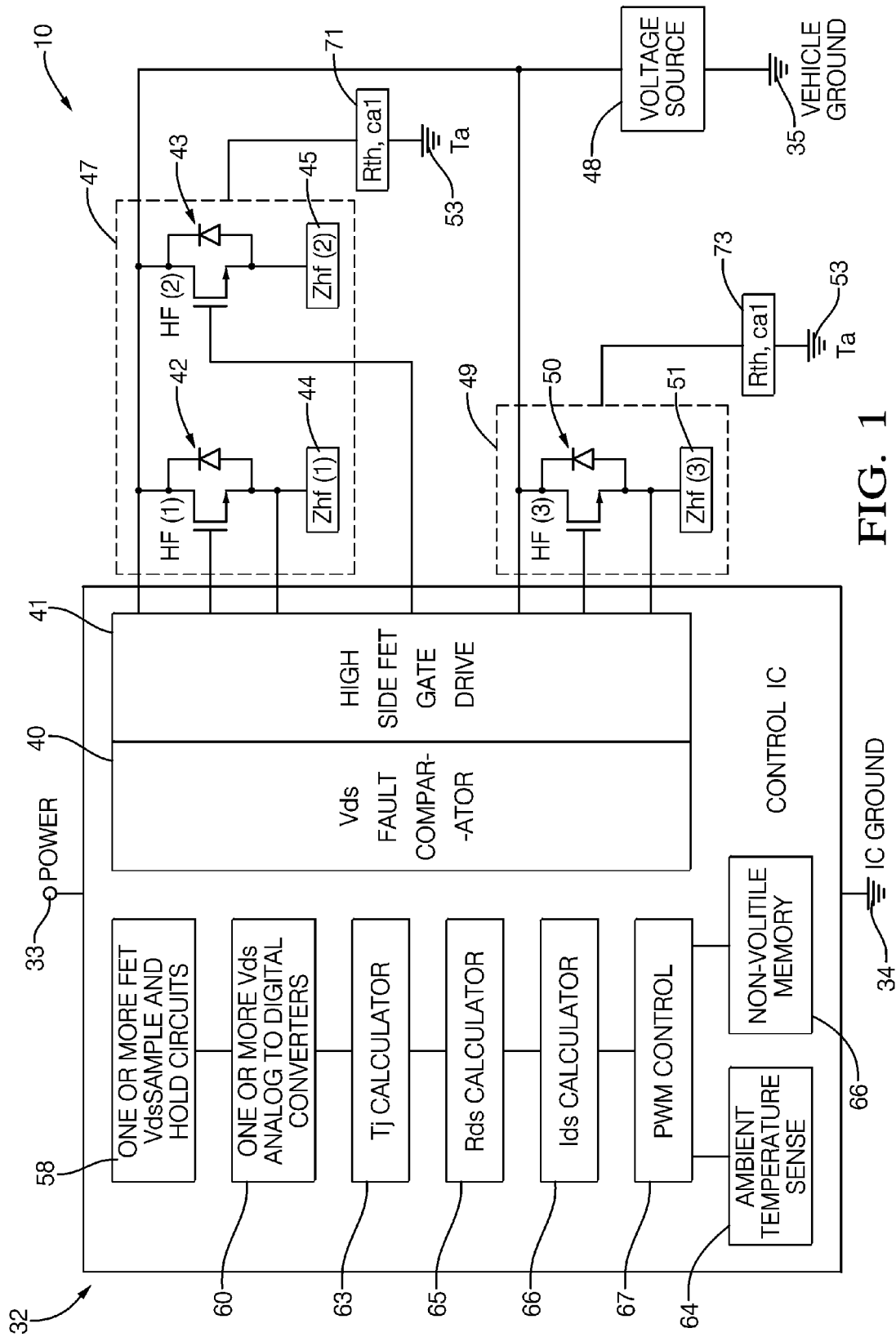
FIG. 1 is a block diagram of the present invention.

In the case of the embodiment shown in FIG. 1, the junction temperature of FET HF(1) 42 and FET HF(2) 43 are the same as the case temperature for case 47 and are calculated formally for using Rth,cal as $$Tj = Ta + \{(Pd(1) * Vds(1)^2 / Rds(1, Tj) + Pd(2) * Vds(2)^2 / Rds(2, Tj)\} * Rth, cal \quad (4)$$

By analogy, the junction temperature of FET HF(3) 50 is the same as the case temperature for case 49 and is calculated formally for using Rth,ca2 as $$Tj = Ta + (Pd(3) * Vds(3)^2 / Rds(3, TD)) * Rth, ca2 \quad (5)$$

(X.) In general, if Rds(Tj) is a second order polynomial, then Tj and there are "n" non-parallel FETs in a common case, the solution to Tj will be found by solving a polynomial equation of order $2n+1$;

(XI.) After Tj is calculated for the FETs in each separate case, the value of Rds(Tj) is calculated for each non-parallel FET in the package;

(XII) The value of Vdsf used for the Vds fault comparator is updated to reflect the latest calculated value of Rds(Tj) as Vdsf=Idsf*Rds(Tj);

(XIII) After the value of Rds(Tj) is calculated for each non-parallel FET in a common case, then the value of Ids=Vds(i)/Rds(i,Tj) is calculated for each non-parallel FET in a common case;

(XIV) After Tj and Ids have been found for each non-parallel FET in a common case, the values are compared in digital logic to stored maximum allowed values and the FETs are turned off if they are deemed to be in an over-current or over-temperature condition;

(XV) The algorithm is repeated for each FET package once the FET receives a turn on command until all FET Ids and Tj values are determined;

(XVI) In the event that one or more FETs in a common case have been turned on and have a calculated Tj, the remaining FETs which are currently in an off state will be assumed to have the same Tj. When the off-state FETs are commanded to turn on, their initial Rds values used for the Vds fault comparator in algorithm steps (I) through (III) will be Rds(Tj), not Rds(Ta).

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A method of determining junction temperature (Tj) and drain-source current (Ids) of a standard three-terminal FET, wherein said standard three-terminal FET is disposed in a module containing a plurality of standard three-terminal FETs, and wherein each FET in said module is thermally and electrically coupled to a common case terminal, with a thermal resistance interconnecting the case and the surrounding module ambient, said method comprising the steps of:

sampling the ambient temperature (Ta) for the module;

sampling the drain to source voltage (Vds) for each FET which is electrically and thermally coupled to the common case within the module;

loading a Tj-dependant equation for each FET on-resistance (Rds(Tj));

loading a value for the thermal resistance (Rth,ca) between the case and module ambient;

solving for a single Tj value for all thermally-coupled FETs in said common case;

using the solved Tj value to calculate a separate value for the drain to source on-resistance (Rds) and drain to source current (Ids) for each of the thermally-coupled FETs in said common case; and using the solved value for Rds for each FET and a maximum allowed transient current (Idsf) to determine if the FET is in a transient over-current condition by monitoring the FET Vds.

2. An apparatus for determining junction temperature (Tj) and drain-source current (Ids) of a standard three-terminal FET, wherein said standard three-terminal FET is disposed in a module containing a plurality of standard three-terminal FETs, and wherein each FET in said module is thermally and electrically coupled to a common case terminal, with a thermal resistance interconnecting the case and the surrounding module ambient, said method comprising the steps of:

means operative to periodically sample the ambient temperature (Ta) for the module;

means operative to periodically sample the drain to source voltage (Vds) for each FET which is electrically and thermally coupled to the common case within the module;

means operative to load and store a Tj-dependant equation for each FET on-resistance (Rds(Tj));

means operative to load and store a value for the thermal resistance (Rth,ca) between the case and module ambient;

means operative to solve for a single Tj value for all thermally-coupled FETs in said common case;

means operative to use the solved Tj value to calculate a separate value for the drain to source on-resistance (Rds) and drain to source current (Ids) for each of the thermally-coupled FETs in said common case; and means operative to use the solved value for Rds for each FET and a maximum allowed transient current (Idsf) to determine if the FET is in a transient over-current condition by monitoring the FET Vds.

* * * * *